July 5, 1966

W. R. KROMER 3,259,273

METHOD OF AND APPARATUS FOR CARBONATING, COOLING, STORING
DISTRIBUTING AND DISPENSING BEVERAGES

Filed Dec. 21, 1964

July 5, 1966 W. R. KROMER 3,259,273
METHOD OF AND APPARATUS FOR CARBONATING, COOLING, STORING
DISTRIBUTING AND DISPENSING BEVERAGES
Filed Dec. 21, 1964 8 Sheets-Sheet 2

United States Patent Office 3,259,273
Patented July 5, 1966

3,259,273
METHOD OF AND APPARATUS FOR CARBONATING, COOLING, STORING, DISTRIBUTING AND DISPENSING BEVERAGES
Wallace R. Kromer, 12700 Fairhill Road, Shaker Heights, Ohio
Filed Dec. 21, 1964, Ser. No. 419,703
16 Claims. (Cl. 222—1)

Reference is made to application Serial No. 229,278, filed October 5, 1962, now Patent No. 3,162,323, by Wallace R. Kromer, for Method of and Apparatus for Carbonating, Cooling, Storing, Distributing and Dispensing Beverages, of which this is a continuation-in-part.

This invention relates to an improved method of and apparatus for carbonating, cooling, storing, distributing and dispensing beverages, the invention being especially useful and having definite advantages in connection with providing and dispensing gas charged beverages such as carbonated water and other gas charged drinks to adjacent or multiple dispensing stations at considerable distance from each other.

Existing systems that provide mixed soft drinks or plain carbonated water used in retail stores, restaurants, or bars generally employ a common carbonator unit consisting of a pump, motor, relay, tank and supply lines to provide water to the pump through lines to the tank and carbon dioxide gas to the tank. Carbon dioxide gas is supplied to the carbonator tank under regulated pressures. Water, usually from the city water supply, is pumped into this tank filled with carbon dioxide gas with a spraying or squirting action so that a percentage of the carbon dioxide gas is absorbed in the water and provides carbonated water. Temperatures in the carbonator tank are maintained between 33° and 40° F. An electrode arrangement within the tank shuts off the pump through a relay when the water level reaches a predetermined upper level within the tank and starts the pump to repeat the cycle when water is drawn from the tank to a predetermined lower level. Cooling the water to 40° or lower before spraying it into the tank is sometimes employed and desirable as low temperature water has a greater affinity for carbon dioxide gas. Some systems cool in the tank or at the point of dispensing on the theory that doing so will retain a reasonable carbon dioxide content in the water; this method requires a high carbon dioxide gas pressure in the tank.

Existing systems provide this carbonated water to the dispensing faucet or faucets through lines running from the carbonator. The water lies inactive in the carbonator and in the lines until it is drawn from a faucet. We refer to this common method of carbonating as "single stage carbonating."

One of the principal objects of the present invention is to provide the retailer or purveyor of beverages with a compact dispensing system for water and other carbonated beverages that will produce highly carbonated water and soft drinks of uniform predetermined temperature; more specifically, to provide a method of and an apparatus for continuous and two-stage carbonation of water for use as or in a beverage.

Another object is to provide a method of and apparatus for cooling, carbonating and storing water in which the dispensing may be done at a plurality of distributed points while the cooling is accomplished at a single point or area so as to minimize complexity and cost of the cooling means.

A further object is to provide a system for supplying carbonated water for beverage purposes in which a relatively high degree of carbonation is achieved with relatively low carbon dioxide pressure. As a secondary objective related to the relatively low carbon dioxide operating pressure with which satisfactory results can be realized is the reduction in expense of operating and maintaining the system as well as the low original cost, leaks and related troubles being minimized with the lower pressures that can be used.

A further object is to provide a system of the above type having only a single pump in the system for circulating the carbonated water and for drawing fresh water into the system.

A further object is to provide a system of the above type with a pressure-temperature relationship wherein slush ice may be dispensed from the dispensing faucets.

Other principal objects are to maintain low temperatures throughout a multiple station carbonated beverage distribution system, to maintain high carbon dioxide content in the water or beverage through constant refrigeration, and to supply such water or beverage throughout such a system to dispersed dispensing stations.

The present invention has, in addition to the objects set forth herein, the same objects and advantages as those set forth in the patent application referred to; they are hereby incorporated herein as though set forth at length; they are achieved and there are also achieved the objectives set forth herein, including the features relating to the two-stage and continuous carbonation and the single pump system, by providing a system which comprises in combination, this being a further and more specific object of the invention, a combined storing and carbonating receptacle or tank adapted to contain water and, above the water an atmosphere of carbon dioxide under pressure, one or more dispensing faucets remote from the receptacle, conduit means connecting the receptacle to a water source and to the faucet or faucets with the receptacle and the faucet or faucets in a closed circuit comprising a feed path from the receptacle to the faucet or faucets and, separate from the feed path, a return path from the faucet or faucets to the receptacle; the contemplated system of the invention also includes in the combination pumping and controlling means forcing water in the circuit to flow continuously thereabout and automatically forcing water from the source into the circuit to replace that dispensed from the faucet or faucets from time to time and automatically maintaining the level of the water in the receptacle between predetermined limits; the system further includes in the combination means supplying carbon dioxide to water flowing in the circuit and maintaining therein and in the atmosphere within the receptacle a relatively high carbon dioxide pressure between predetermined limits; and the system includes means directing the flowing water and causing it to flow through the carbon dioxide atmosphere in a form having a high surface to cross section ratio so as to provide continuous and repetitious exposure of the circulating water to the carbon dioxide atmosphere for continuous carbonation.

Still further objects and advantages which pertain to certain useful and novel features of construction and combinations of parts advantageous in installation and operation of a system such as referred to will be apparent from the following detailed description of the invention made in connection with the accompanying drawings which form a part of the specification. Like parts throughout the several views are indicated by the same letters and numerals of reference.

Figures 1, 2, 3, 4:
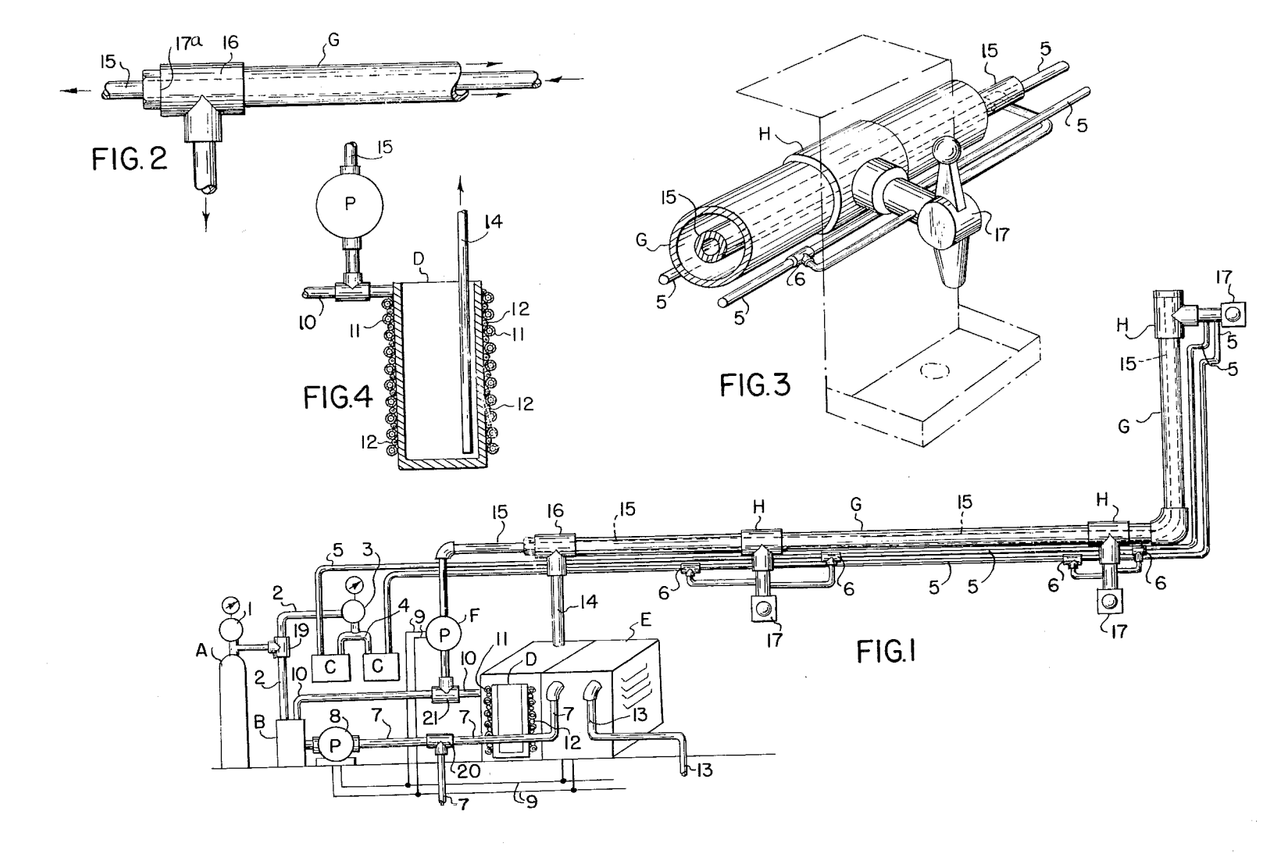
FIG. 1 is a diagrammatic view and layout as in my co-pending application referred to, partly elevational, partly in plan and partly in perspective, showing a beverage making, cooling, storing, and dispensing system, illustrative of and embodying principles of the present invention.
FIG. 2 is a fragmentary elevation detail showing a portion of the main conduit or manifold and certain of the related conduits employed in the apparatus of FIG. 1, this view being partly in phantom and enlarged with respect to that figure.
FIG. 3 is a fragmentary perspective view of a dispensing station assembly as employed in the apparatus of FIG. 1, this view being partly in phantom and enlarged with respect to that figure.
FIG. 4 is a vertical sectional view, partly diagrammatic, with parts broken away and removed, through the receptacle or storage tank of the system of FIG. 1, showing the attached refrigerant lines or coils and the incoming carbonated water line or supply tube through the circulating pump, this view being enlarged with respect to that figure.

In the illustrated system for mixing, cooling, storing and dispensing carbonated non-alcoholic beverages, the components are, in general, represented diagrammatically for the reason that, except where structure is specifically described and illustrated, the invention is concerned with the combinations involved rather than with the structural details of the individual parts and components. A $CO_2$ storage tank A, equipped with a high pressure regulator 1 and gauge, delivers $CO_2$ gas through a conduit or line 2 to low pressure regulator and gauge 3 where pressure is regulated to supply, through a suitable branched conductor or line 4, a blanket of $CO_2$ gas under regulated pressure on flavored syrups in tanks C. By this gas pressure, the syrups are forced to flow through lines 5 which are wrapped tightly to and extend substantially the full length of a refrigerated or main conduit G. T's 6 are provided in the syrup conduits or lines at dispensing stations H so that the syrups are available as needed, being regulated through faucets 17.

Providing highly carbonated water for the apparatus is a carbonator B supplied with high pressure $CO_2$ gas from a T 19 in the line 2 and with drinking water from a suitable source such, for example, as a city water line 7. Pump 8, connected between the water source and the carbonator B, is driven by a motor using power from electric line 9, forcing water from the source under high pressure into and mixing with the $CO_2$ in the storage tank of the carbonator B. Automatic operation and replenishment of the supply of water to the carbonator B is accomplished by making electrical contact for operation of the water pump 8 through electrodes (such as later referred to in connection with the system shown in FIG. 5) that make and break contact and start and stop the pump in repeating the mixing operation as the surface of the water in the mixing tank of the carbonator is lowered and raised to the contact levels. The carbonated water is forced by the pressure within the storage or mixing tank of the carbonator B through line 10 into a cooling coil 11 attached to and coiled with a refrigerant line 12 wrapped about a storage tank D. A suitable refrigerant condensing unit E, operating automatically, supplies the refrigerant to the conduit 12, the size and capacity of such unit being determined conventionally by the desired rating of the system in gallons of cooled beverage per hour. The temperature of the carbonated water is thus reduced to desired serving temperature before reaching the last coil that empties into the storage tank D.

The refrigerant coil 12 serves a double prupose as, wrapped around the tank D, it holds the temperature of carbonated water stored therein at a predetermined temperature, say between 34 and 40 degrees Fahrenheit. The condensing unit E is preferably water cooled so that its efficiency is not impaired if it is installed in a cabinet or under a counter or in some similar enclosed and restricted space, such water is supplied as from the T 20 in the supply line 7. Waste water exiting from the condensing unit E through pipe or line 13 may be run to drain or can be piped to a sink under or associated with one of the dispensing stations H to provide warm, clean rinse water.

The storage tank D is connected to one, preferably the near, end of the conduit G through a tap rod or dip pipe 14 and a header 16, the carbonated water returning from the other or remote end of the conduit G through a return conduit or line 15. This return line 15 may be run on the outisde of and parallel to the supply line G through use of a return bend at the remote station or, as shown, preferably line 15 is run inside the conduit G, through an opening 17A (FIG. 2) in the near header 16 and thence to a circulating pump F, the pump connecting by a T 21 to the supply line 10 from the carbonator B, thereby completing a closed circuit. Placement of the return line within the supply conduit minimizes the surface area of such line exposed for heat gain, no heat being absorbed on the return flow through the refrigerated water within the supply line G. The conduit G and the conduit 15 serve as containers supplementing the storage container D in providing a reserve supply of refrigerated carbonated water.

When the faucet 17 is opened at the last or remote station, any entrapped air will be driven from the conduit G and the return line 15 and the conduit system will fill with refrigerated water. The circulating pump F, powered by a motor supplied with energy from the electric line 9, is in constant operation. Carbonated water is drawn from the remote end of the supply conduit G through the return conduit 15 and circulated through the cooling coil 11, thereby removing any heat gain or pickup by the stream in its travel through the length of the supply and return conduits. The desired rate of flow of the stream of carbonated water depends upon the length of run and the expected heat gain through the walls of the insulated supply conduit. The rate of flow is conveniently adjusted as by change of impeller in the pump F so that in operation the circulating water charged with carbon dioxide varies in temperature very little, in some instances less than about one degree from the tank D to the remote station H.

Figure 5:
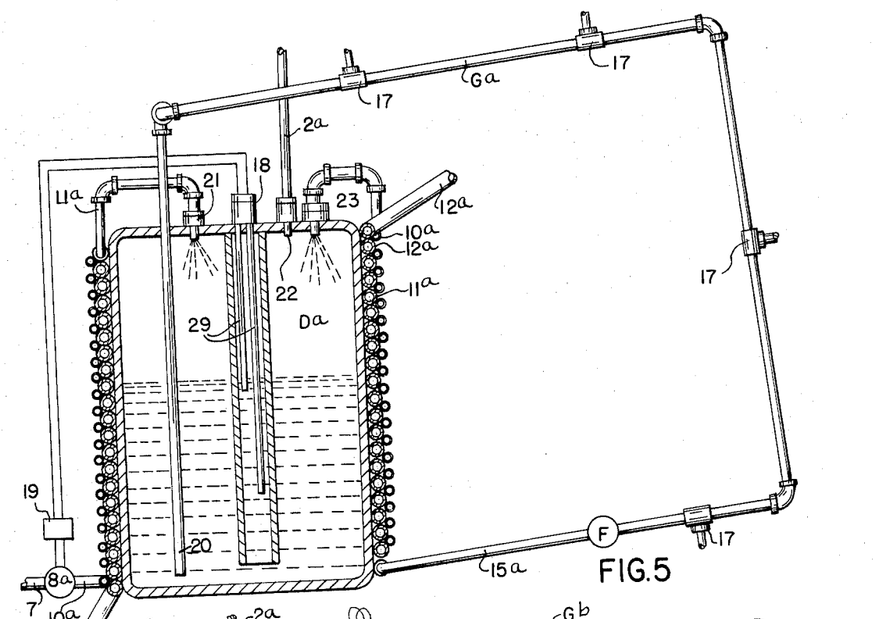
FIG. 5 shows a modification of the system of FIGS. 1 through 4 in which an atmosphere of carbon dioxide is maintained in the storage receptacle and it constitutes a carbonator, the circulating water and the water introduced to replace that dispensed being passed through such atmosphere, this view being enlarged with respect to FIG. 1, partly diagrammatic, partly in section and with parts removed.

FIG. 5 illustrates diagrammatically a modification of the system of FIG. 1, only such parts being shown as are necessary to understanding of the changes. The modified apparatus provides for refrigeration of the make-up water before it is commingled with the circulating water, for refrigeration of the water being stored and circulated, for initial or first stage carbonation of the make-up water and for second stage carbonation of the circulating water. Parts which, in the system of FIG. 5 are the same as described above in connection with the preceding figures, are designated by the same letters and numerals of reference; parts which, in FIG. 5, correspond or are similar to parts previously described are designated by the same reference numerals and letters with the suffix "a."

Refrigerant line 12a is wrapped around and secured to a combined storing, cooling and carbonating receptacle or tank Da. Water conduit or line 10a is also wrapped around the receptacle Da, the convolutions of the water conduit 10a being disposed in the valley of the refrigerant coil 12a. Water is supplied to the conduit 10a through a conduit 7 from a suitable source such as a city water line, the water being forced into the system by a pump 8a controlled similarly to the pump 8 of FIG. 1. The upper end of the water coil 10a is connected to a combination check valve and nozzle 23 in the top of the receptacle Da. Water forced through the coil portion of the conduit 10a and the nozzle device 23 is released and sprayed by the latter into the top or upper portion of the receptacle or tank Da and through an atmosphere of carbon dioxide gas maintained in the receptacle in the space above the level of the water or liquid in the latter. The carbon dioxide gas is forced into the space above the water in the receptacle Da through a combination gas inlet and check valve 22 which is connected by tube or conduit 2a to a suitable source of $CO_2$ gas under regulated pressure such as the tank A and the regulator 1 of FIG. 1. When the body of water rising in the receptacle Da reaches a predetermined level as sensed by a conventional control assembly 18 comprising contact breaker means and related electrodes, the control assembly operates a relay 19 and shuts off the electric power supply to the motor of the pump 8a, thereby halting the supply of make-up or fresh water to the system.

Externally of the carbonating receptacle or tank Da the water flows through a distributing circuit represented by conduit Ga and return pipe or line 15a and similar to that previously described. The carbonated water leaves the receptacle Da through a dip pipe 20, which corresponds to the tap rod or dip pipe 14 of FIGS. 1 and 4, circulation of the water through the external circuit and return to the receptacle or tank Da being effected by the continuously operated pump F. The returning water enters the bottom or lower end of and goes through a cooling coil 11a that is within the refrigerant line 12a and is surrounded by refrigerant. From the upper end of the cooling coil 11a the returning water is conducted into the carbon dioxide atmosphere within the receptacle Da, being sprayed through return inlet nozzle 21 mounted through and supported by the top of the tank Da. This the water, initially carbonated or charged with carbon dioxide gas in a first carbonating stage when sprayed into the carbon dioxide atmosphere through the combination check valve and nozzle 23, is again and repeatedly carbonated in a continuously functioning second stage when and each time it is sprayed into the carbon dioxide atmosphere of the tank Da through the return inlet 21.

The refrigerant supplied to the coil or line 12a is so controlled that a temperature of approximately freezing is maintained in the cooling coil 11a carrying the circulating carbonated water. Thus the circulating water is conducted through the refrigerated or principal heat release portion of the cycle immediately before being sprayed into the carbonating atmosphere above the water in the receptacle or tank Da. This relatively cold returning water, already containing carbon dioxide from previous treatment, absorbs additional carbon dioxide gas in the second stage treatment and achieves a gas absorption percentage higher than is commercially possible with single stage carbonation. The two-stage carbonating process of the present invention makes it possible to operate with a relatively lower pressure of carbon dioxide gas in the tank Da. In a single stage carbonating system such as shown in FIG. 1, a ratio of between 4 and 5 volumes of carbon dioxide gas to 1 volume of water is obtained with a carbon dioxide gas pressure of from about 100 to about 125 pounds per square inch gauge. Using the two stage and continuous carbonating system of the present invention, the water will achieve a gas content of about 5 volumes to 1 volume of water with a carbon dioxide gas pressure of about 60 pounds per square inch gauge in the tank Da.

As carbonated water is drawn from the circulating or distributing system through the faucets 17, the water level in the receptacle or tank Da is lowered. However, operation of the pump F is not interrupted and circulation of the water in the conduit Ga continues since the outgoing dip tube 20 is below the lowest operating level of the water within the receptacle Da. As the water level is thus lowered by such release of the carbonated water from the system, it reaches the point at which one of the electrodes 29 in the control assembly 18 actuates the electrical control circuit in accordance with conventional practice to start the motor of the make-up water feed pump 8a so that fresh water is first cooled, then forced into the tank Da and subjected to the first stage of carbonating. Beverage or water dispensed from the circulating system is thus replaced automatically, the pump being stopped when the water level reaches the control setting of the other of the electrodes 29.

Figure 6:
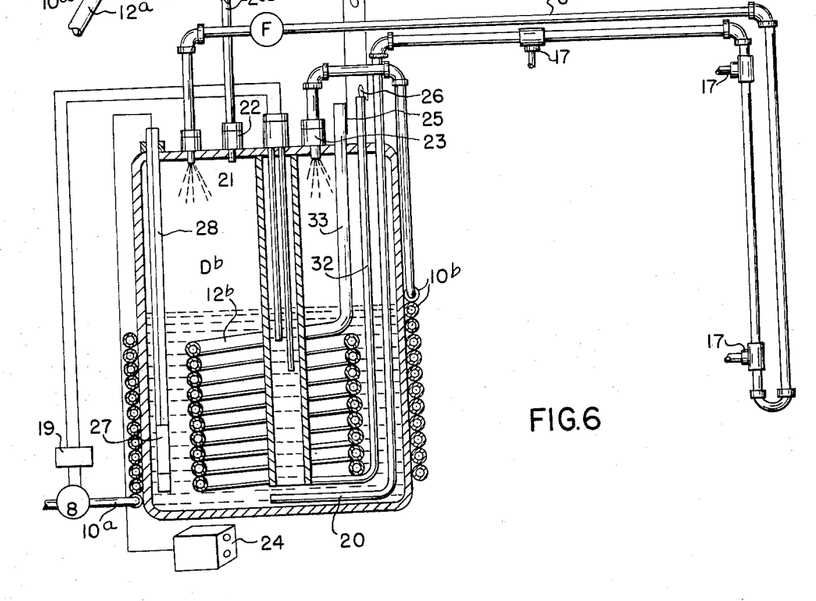
FIG. 6 shows another modification similar to that of FIG. 5 in which an evaporator coil for refrigerant is located within the storage receptacle and is immersed in the water to provide direct contact with the water and to produce a lower temperature of that liquid for greater saturation of carbon dioxide, this view also being enlarged with respect to FIG. 1, partly diagrammatic, partly in section and with parts removed.

In FIG. 6 is illustrated diagrammatically another modification of the system of FIG. 1, only such parts being shown as are necessary to understanding of the changes. Parts which are the same as described previously are designated by the same letters and numerals of reference; parts which correspond or are similar to parts previously described are designated by the same reference numerals and letters with the suffix "b."

In this modified arrangement, a refrigerating medium is circulated through and evaporated in a coil 12b immersed in the water contained in a carbonating and storing receptacle or tank Db which corresponds to the tanks D and Da previously described. The water circuit external to the receptacle Db is through a conduit Gb similar to the conduit G of FIG. 1. The immersed or enclosed coil 12b is conventional tubing such as used for beverages, of stainless steel or material of like characteristics such that no chemical reaction with the carbonated water will result.

A thermostatic expansion valve 26 controls the supply of liquid refrigerant to the immersed evaporator coil 12b, the refrigerant being a gas such as Freon supplied by a conventional compressor unit. From the valve 26 the refrigerant is conducted to the lower end of the refrigerant coil 12b through a conduit 32. A bulb 25 is attached to return tube 33 from the coil 12b and is arranged to close the expansion valve 26 on cooling of the system, and open it on warming of the system. Ice builds up on the refrigerant coil 12b immersed in the body of water contained in the carbonating and storing tank Db. When the buildup results in the ice touching or making substantially direct heat exchange with a bulb well 28 in which a thermostatic control bulb 27 is inserted, a conventional temperature control 24 is thereby actuated to shut off the refrigeration compressor. Circulation of the refrigerant is thus arrested until the ice retreats, at which time the warm up of the bulb 27 acts through the control 24 to start the refrigeration compressor and feed refrigerant into the coil 12b and repeat the cycle.

Incoming make-up water for the initial or first stage carbonation is sprayed into the receptacle or tank Db through the check valve and nozzle 23 after precooling through a coil 10b wrapped around the outside of and in direct heat exchanging contact with the lower part of the receptacle Db containing refrigerated water.

The cycling or circulating of refrigerated carbonated water through the system is accomplished continuously by the pump F. The water is drawn from the bottom of the tank Db, circulated through the conduit Gb (which may be essentially the same as G in FIG. 1), conducted past the faucets 17 and, except for that withdrawn at the faucets, returned to the tank Db through the combination check valve and nozzle 21, thereby completing the circuit with the second stage carbonation occurring continuously as the water is sprayed into the top of the tank through the nozzle. As in the system described in connection with FIG. 5, it is the relatively low temperature returning water that is continuously sprayed into the carbon dioxide atmosphere maintained in the upper part of the combination storing and carbonating receptacle (Db in FIG. 6, Da in FIG. 5), the lower temperature of the water being conducive to its becoming saturated with the carbon dioxide gas; such returning recarbonated water goes directly into the reserve supply maintained automatically at a predetermined level and temperature in the lower part of the receptacle Db.

The ice bank on the refrigerating coil 12b provides reserve cooling capacity for peak service periods. The body of carbonated beverage or water maintained on reserve in the receptacle Db, because of its high carbon dioxide gas content and the fact that it is kept in continuous motion, can be safely reduced in temperatures close to the freezing point of water at the same pressure without freezing danger. The lower temperature thus achieved in practice provides a more palatable drink, requires less ice in the serving glass and results in less dilution of the beverage.

Figure 7:
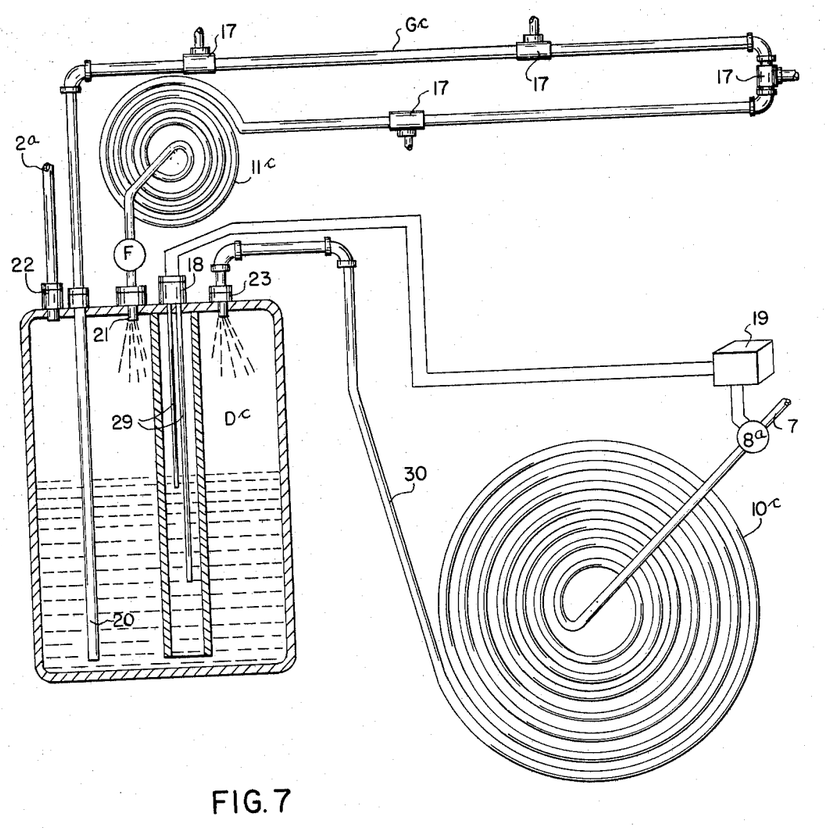
FIG. 7 shows still another modification similar to those of FIGS. 5 and 6 in which the conduit through which water is supplied to the system and the conduit through which the carbonated water is circulated externally of the storing and carbonating receptacle each includes a heat exchange portion adapted to be maintained in heat exchange relation to a refrigerating medium, this view also being enlarged with respect to FIG. 1, partly diagrammatic, partly in section, and with parts removed.

In FIG. 7 is illustrated diagrammatically another modification of the system of FIG. 1, only such parts being shown as are necessary to understanding of the changes. In this modification there is also provided first and second stage continuous carbonation similar to the arrangements of FIGS. 5 and 6. Like parts are indicated by the same reference numerals, corresponding or similar parts are indicated by the same numerals with the suffix "c."

Incoming make-up water or beverage supplied as from the city water line or conduit 7 and the pump 8a is passed through a coiled line or precooling conduit 10c adapted to be located in a conventional refrigerated space such as a water bath or ice cube storage bin located in the purveyor's existing facilities. From the precooling coil 10c the make-up water is conducted to the combination nozzle and check valve 23 through a suitable conduit or flexible connector 30. A precooling coil 11c, similar to the precooling coil 10c, is connected between the return end of distributing conduit Gc and the circulating pump F for the purpose of cooling the returning carbonated water to the desired low temperature immediately prior to projecting such carbonated water through the nozzle 21 into the carbon dioxide atmosphere in combination storing and carbonating receptacle Dc in the second stage carbonation previously referred to. The precooling coil 11c is located in a suitable refrigerating environment such as a water bath or ice cube storage bin of the purveyor's existing facilities. The carbonator tank or receptacle Dc may likewise be located in the same refrigerated space, water bath or ice cube storage bin. Thus the arrangement of FIG. 7 provides a two-stage carbonating system and a primary circulating and cooling system for water or other beverage using existing refrigeration facilities, thus achieving the desired result at low cost.

Figures 8, 9:
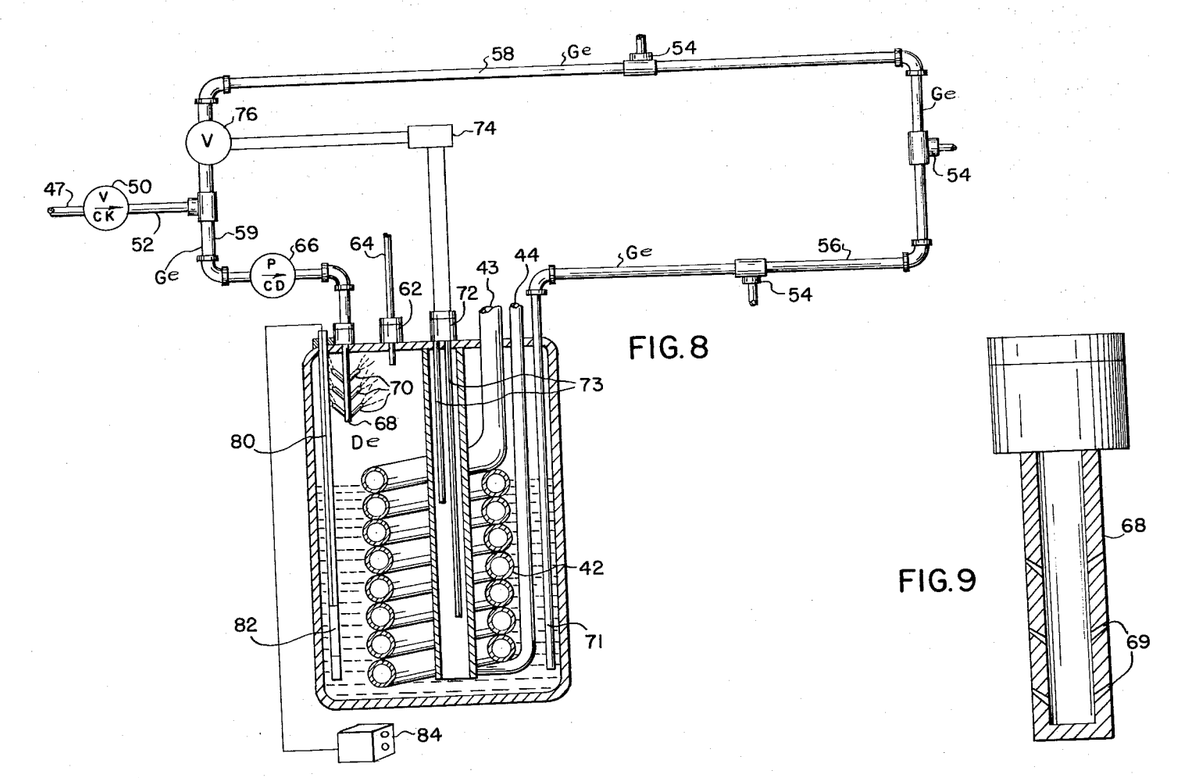
FIG. 8 shows further modifications of the systems of FIGS. 1 through 6, this view being enlarged with respect to FIG. 1, partly diagrammatic, partly in section and with parts removed.
FIG. 9 is an enlarged front elevational view, partly in section, of the water spray head shown in FIG. 8 and showing a modification thereof.

FIG. 8 illustrates diagrammatically further modifications of the system shown in FIG. 1, only such parts being shown as are necessary to the understanding of the changes.

In this modification, there is also provided first and second stage continuous carbonation similar to the arrangement of FIGS. 5, 6, and 7. Refrigerant coil 42, containing a circulating refrigerant medium, is disposed in the lower portion of the combined storing, cooling and carbonating receptacle De whereby the product stored in the interior of the receptacle is cooled to a predetermined temperature as aforedescribed. The coil 42 is similar in structure and function to the coil 12b of FIG. 6, the coil inlet and outlet lines 43 and 44 leading to an associated conventional refrigerant unit.

Fresh water is supplied under pressure through the conduit or pipe line 47 from a suitable pressurized source of fresh water, such as a city water line. From the conduit 47, the water flows through the check valve 50, through the conduit or pipe line 52 and thence into the distributing circuit represented by the conduit or conduit means Ge which contains the usual remote dispensing faucets 54, said conduit Ge including the feed path 56 and the return path 58, 59. Carbon dioxide gas is forced into the space above the liquid in the receptacle De through a combination gas inlet and check valve 62, which is connected by a tube 64 to a suitable source of pressurized carbon dioxide gas under regulated pressure such as the tank A and regulator 1 of FIG. 1, such construction providing a pressurized carbon dioxide atmosphere in the space above the liquid in the receptacle De. Thus, fresh water entering the system from the conduit 52 flows through the pump 66 and thence through the spray head 68 whereby water is released and sprayed into the top or upper portion of the receptacle De and through the carbon dioxide atmosphere contained therein to form carbonated water, all as aforedescribed. Thus, in FIG. 8, the water flows counterclockwise through the system.

The spray head 68 releases the water into the carbon dioxide atmosphere in the receptacle De in an upward and outward direction. This is accomplished by the upwardly and outwardly directed orifices (FIG. 9) in the spray head, or by the upwardly and outwardly directed nozzles 70 (FIG. 8) in such spray head. With this construction, such upwardly and outwardly sprayed water is broken up in mist by striking the top of the receptacle and is sprayed longer and more thoroughly through the carbon dioxide atmosphere in the upper portion of the receptacle De, after which the sprayed water drops down over the cooling coils 42. Thus, the incoming water is cooled quicker and becomes more completely carbonated than in prior structures. Also, the sprayed water forms a mist layer on top of the water and gradually cools as it falls to the bottom. Also, less dilution of the water in storage is effected.

The pump 66 operates continuously and circulates the water in the line Ge in a counterclockwise direction, as aforementioned, in a manner similar to that previously described, the carbonated water leaving the receptacle De through the dip pipe 71.

Conduit and valve means in the form of the pipe line 47, 52, the check valve 50, the valve 76, and a liquid level control or water level sensing means in the form of the assembly 72 and the liquid level control relay 74 are provided to automatically replenish fresh water to the circuit in a manner now to be described. When the body of water in the receptacle De falls to a predetermined lower level as sensed by a conventional control assembly 72 comprising the electrodes 73 and a related contact breaker means, the control assembly operates or triggers a relay 74 which triggers the normally-opened solenoid valve 76 to a closed position, thereby stopping circulation of carbonated water and, also, lowering the pressure in the return line or path 59. However, since the pump 66 is operating continuously, fresh water is then drawn from the line 47, through the check valve 50 (which opens because of the decreased pressure in lines 52 and 59), through the pump 66 and thence into the receptacle De via the spray head 68. When the water level in the receptacle De rises to a predetermined upper level, the assembly 72 operates or triggers the liquid level control relay 74 which triggers the valve 76 to its normally open position, whereby the check valve 50 automatically closes (because of the increase in pressure in lines 52 and 59) and stops the flow of water through the pipe line 52, thereby again commencing circulation of the carbonated water counterclockwise through the line Ge. The check valve 50 is preset to permit passage of fresh water through the line 52 only when water pressure in the line 59 has dropped to a predetermined lower value. The check valve 50 also functions to prevent the circulating water in the line Ge from entering the city water inlet line 47. Thus, only a single pump is required in the present system to draw fresh water into the system and to circulate the carbonated water through the line Ge to the remote faucets 54.

In the structure shown in FIGS. 6 and 8 wherein the refrigerant coils are disposed interiorly of the combined cooling, storing and carbonating receptacle, the pressure of the carbon dioxide gas maintained in the receptacle should be at least six and preferably eight times atmospheric pressure. In prior structures, it was never considered feasible to lower the temperature in the receptacle below 33 degrees Fahrenheit as the entire system would freeze. However, with the present structure, temperatures well below 32 degrees Fahrenheit may be effected in the receptacle without forming ice therein. More specifically, the high carbon dioxide pressure (115 p.s.i. to 125 p.s.i., for example) in the receptacle permits the carbonated water in the receptacle and in the distributing conduit to be maintained at temperatures well below 32 degrees without freezing and without additional work from the refrigerator compressor. For example, at 80 p.s.i., the refrigerant temperature is about 29 degrees without freezing; at 108 p.s.i., the refrigerant temperature is about 27 degrees without freezing; and at 125 p.s.i., the refrigerant temperature is about 25 degrees without freezing. Generally, in such range, every 10 p.s.i. increase in pressure reduces the water temperatures by one degree to one and one-half degrees without forming ice. An important feature of this pressure-temperature relationship is the fact that when such pressurized (115 p.s.i. to 125 p.s.i.), low temperature (25 degrees to 27 degrees), carbonated water is released through the faucets to normal atmospheric pressure, slush ice results, since 27 degree to 29 degree water cannot exist in any other form but ice at atmospheric pressure. Although, with such structure, slush ice is formed at the faucets, there is no slush ice in the receptacle or in the dispensing conduit as the high pressures aforementioned are maintained in both the receptacle and in the dispensing conduit. Such slush ice feature is highly desirable as slush ice is preferred in many types of drinks, particularly soft drinks for which the present invention is particularly adapted. A further advantage of the low temperatures is the fact that such low temperatures contribute to better carbonation of the water.

The refrigerant coils may be disposed exteriorly of the receptacle, as shown in FIG. 4, for example, or may be disposed interiorly of the receptacle, as shown in FIGS. 6 and 8, the latter being preferred for more effective and efficient temperature control of the stored water.

Temperature of the liquid in the receptacle is controlled by the thermostatic control bulb 82 in the bulb well 80 and by the temperature control 84. When the temperature of the carbonated water in the receptacle reaches the desired low temperature as selected, the thermostat control bulb 82 which is inserted in the bulb well 80 is actuated and, in turn, the conventional temperature control 84 is triggered to shut off the refrigerator compressor. Circulation of the refrigerant is thus arrested, and subsequent warm up of the bulb 82 acts through the control 84 to start the refrigeration compressor and feed refrigerant into the coil 42 and repeat the cycle.

Figure 10:
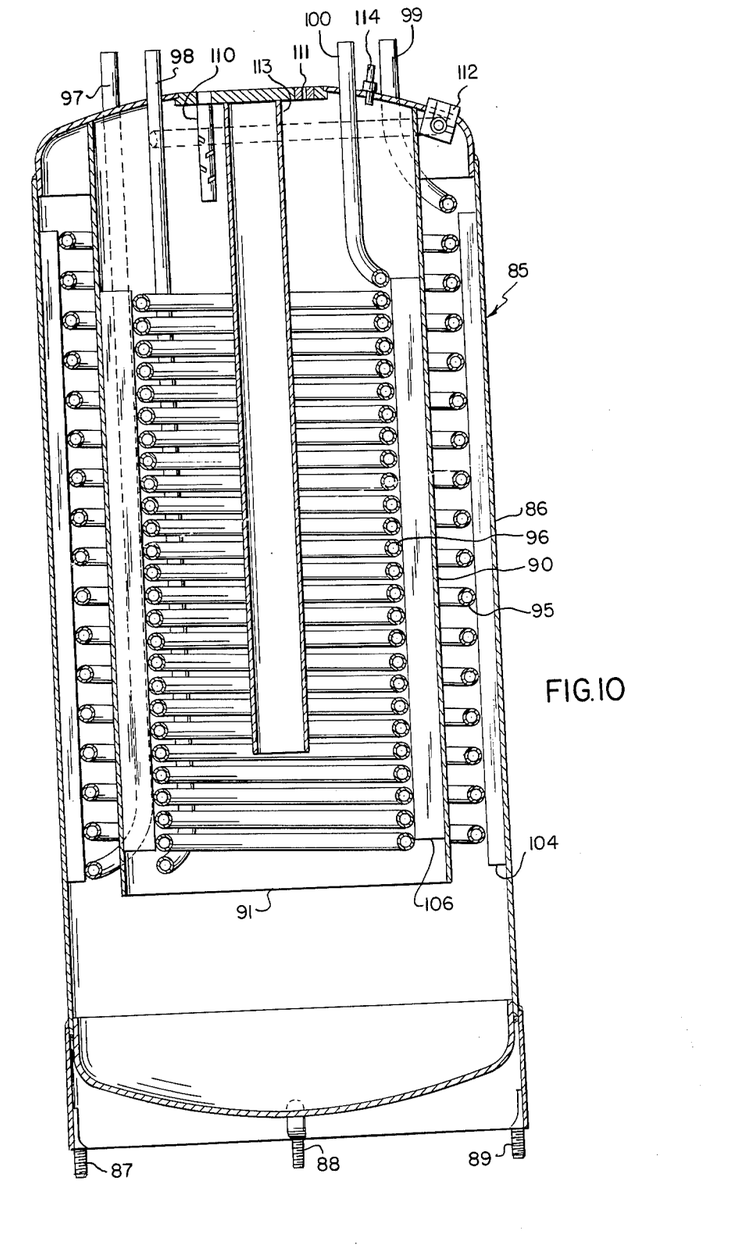
FIG. 10 is a vertical sectional view of a modified carbonator constructed in accordance with the invention, with certain parts thereof removed.

Referring now to FIG. 10, there is shown a double-tank cooler carbonator tank, generally designated as 85, only such parts being shown as are necessary to an understanding of the changes. The carbonator 85 is similar in function to the cooler carbonators abovedescribed except that it contains a double tank structure along with a dual-coil refrigerant line system, now to be described.

The cooler carbonator 85 includes an outer cylindrical storage tank 86 supported upright on the studs or feet 87, 88 and 89. Disposed interiorly of the tank 86 is a smaller coacting cylindrical tank or receptacle 90. It is to be particularly noted that the inner tank 90 is bottomless thereby providing a common interior with the tank 86, such structure substantially increasing the carbonated water reserve storage capacity of the system. Such structure provides the bottom opening 91.

The carbonator 85 also includes outer and inner refrigerant coils 95 and 96, respectively, containing the conventional circulating refrigerant medium whereby the carbonated water within the tanks 86 and 90 is cooled to a predetermined temperature as aforedescribed. The coils 95 and 96 are similar in structure and function to the coil 12b of FIG. 6, said coils 95 and 96 having the respective inlet lines 97 and 98, and the respective outlet lines 99 and 100 leading to an associated conventional refrigerant unit. It is to be noted, however, that the coil 95 is disposed between the inner and outer tanks 90 and 86 and, specifically, is secured to the elongated spacer 104 which, in turn, is secured to the inner surface of the outer tank 86. Likewise, the inner coil 96 is secured to the elongated inner spacer 106 which, in turn, is secured to the inner surface of the inner tank 90. With this construction, quick, even cooling of the carbonated water within the inner and outer tanks is effected. Also the warm incoming make-up water will be cooled to a greater extent than in prior structures.

In other respects, the carbonator 85 is similar to those above-described including first and second stage carbonation, and contains the usual fresh water inlet and spray head 110, a carbonated water return or inlet 111 (from the usual circulating line), a carbonated water outlet 112 (to the circulating line), a bulb well 113 for receiving liquid level control electrodes, and a carbon dioxide gas inlet and check valve 114, further details of such parts not deemed necessary as the same have been described with respect to the systems shown in FIGS. 5, 6, 7 and 8.

In operation, the double tank and dual refrigerant coil structures of the carbonator 85 provide many advantages. The reserve capacity of the carbonated water is substantially increased to provide uninterrupted fast draw or "flash" usage at the remote dispensing faucets. For example, in one structure effected, the outer tank contains ample, two gallons of soda water and the inner tank three gallons. The dual refrigerant coil system provides quick, even cooling—the usual temperature being about 26° to 27° Fahrenheit, with pressure being equal in both tanks.

Also, thorough circulation of the carbonated or soda water within the tanks and over the refrigerant coils therein is provided—the soda water entering the top of the inner tank 90, thence flowing through the bottom of the inner tank and out the top of the outer tank 86 through the outlet 112. Additionally, room is thus provided for the additional low side refrigerant coils, thereby permitting a larger horsepower refrigerant compressor to be used.

Figure 11:
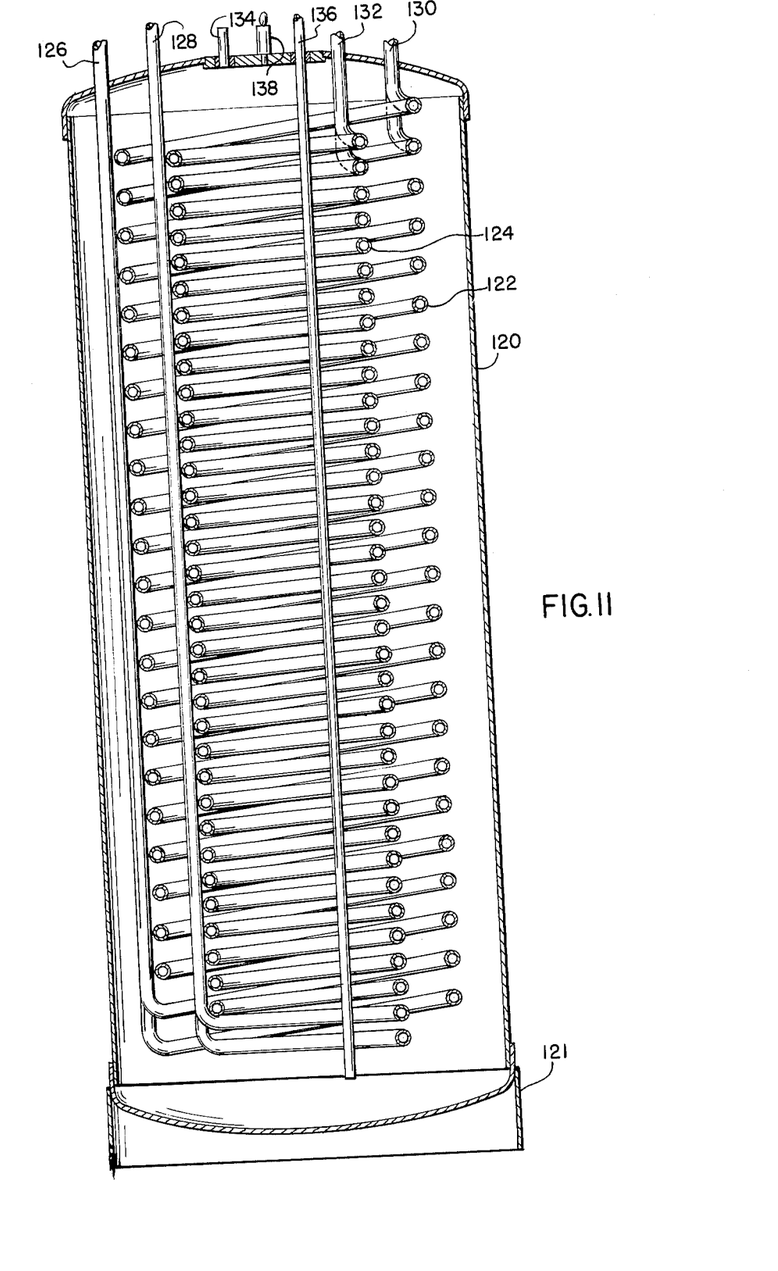
FIG. 11 is a vertical sectional view of a storage and heat exchanger tank adapted for use in any of the systems shown in FIGS. 1, 5, 6, 7 and 8.

Referring now to FIG. 11, there is shown a carbonated water storage tank 120, disposed on a base 121, and adapted for use in the return circulating line of any of the systems above-described for receiving carbonated water therein for reserve storage purposes, particularly for peak load operations. Interiorly of the tank 120 are the outer and inner cooling coils 122 and 124 having, respectively, inlet lines 126 and 128, and outlet lines 130 and 132. Cold carbonated or soda water from the usual return circulating line enters through the soda water inlet pipe 134 and flows back to the circulating system through the soda water outlet pipe 136, such soda water functioning as a refrigerant to cool the coils 122 and 124. In use, the tank 120 is entirely filled with soda water. An air vent or valve 138 is provided at the top of the tank.

The coils 122 and 124 are adapted for receiving and cooling any desired liquid such as some of those used in the above-described carbonating systems such as, for example, cooling flavoring syrups, precooling the incoming city water for carbonator make-up water or for cooling water for non-carbonated drinks. For example, in FIG. 1, before the warm syrups in the tanks C are forced to flow into the circulating system through the lines 5, they may be run through the coils 122, 124 of the tank 120 to cool the syrups.

In fact, the tank 120 may be of sufficient size to accommodate more than the two separate coils shown, thus enabling the cooling of two or more different flavor syrups. Also, the incoming city water for make-up water to the carbonator may be cooled in a like manner in the above system, for example, by first running it through the coils 122, 124 where it may be reduced to the temperature of the return soda water, and thence into the carbonator. Thus, the tank 120 functions as a reserve storage tank for the carbonated or soda water against fast and continuous draw from the remote dispensing faucets and, additionally, serves to cool any liquid used in the system such as city water, syrups, etc., thereby increasing the operating efficiency of the system in providing a consistent mixed drink temperature and carbonation. City water so cooled may also be piped directly to one or more of the remote dispensing faucets in the circulating system to provide non-carbonated beverages thereat.

Figure 13:
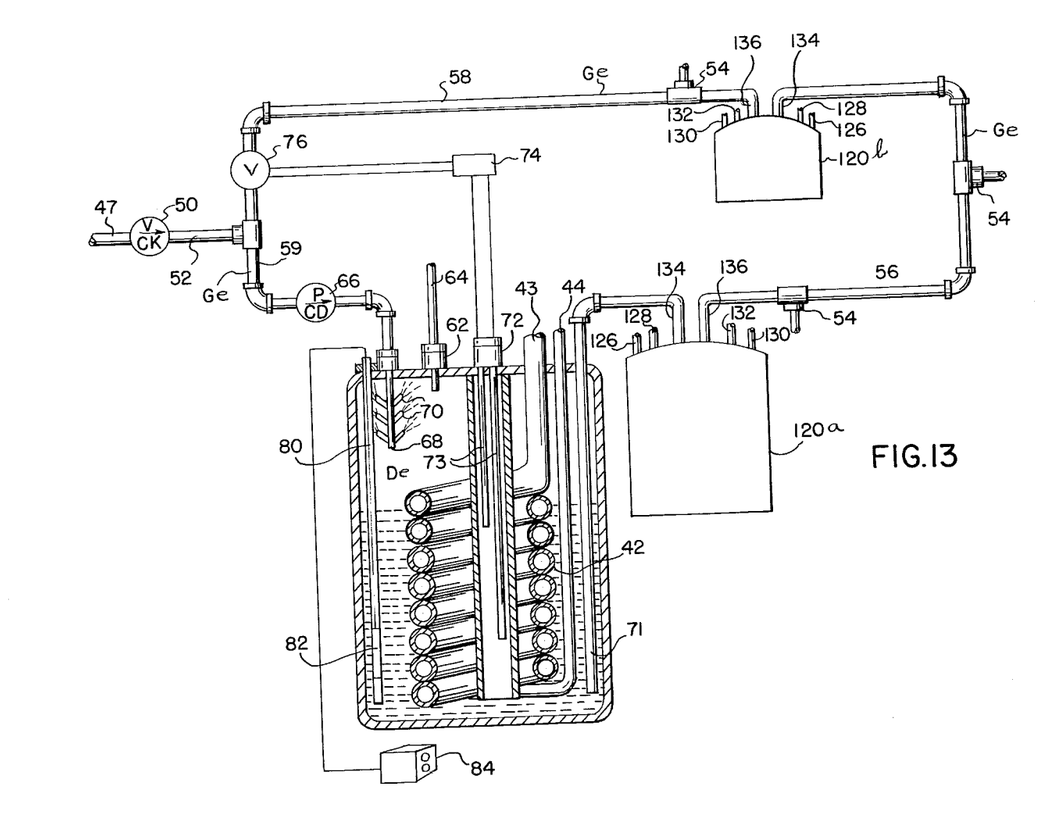
FIG. 13 is a view of a carbonating system similar to that shown in FIG. 8, but showing the positioning of the reserve storage tanks in such system.

With respect to FIG. 13, the carbonator system is the same as that shown in FIG. 8 except that the preferred positioning of the reserve storage tanks are shown. Parts which, in the system of FIG. 13, are the same as described above in connection with FIG. 8, are designated by the same letters and numerals of reference.

In operation, a 15 gallon tank will provide 300 drinks, a 20-gallon tank 400 drinks, etc. Thus, the tank 120 not only increases the capacity of the system, but also permits the use of a smaller cooler carbonator unit for build-up of reserve carbonated water for "flash" usage. In one form of the invention, the reserve storage tank may be placed, for example, adjacent to the cooler carbonator such as the storage tank 120a in FIG. 13, or at any place in the circulating soda lines in any of the above systems. Multiple reserve storage tanks may be used at each of several remote dispensing stations should volume so require, and preferably should be placed in the supply line ahead of the faucet (such as the storage tank 120b in FIG. 13) and in such case a smaller five or ten gallon tank may be used. However, since more than 400 drinks may be stored in the main booster tank 120a and in the supply and return lines, there normally is little need for multiple tanks 120b.

Figure 12:
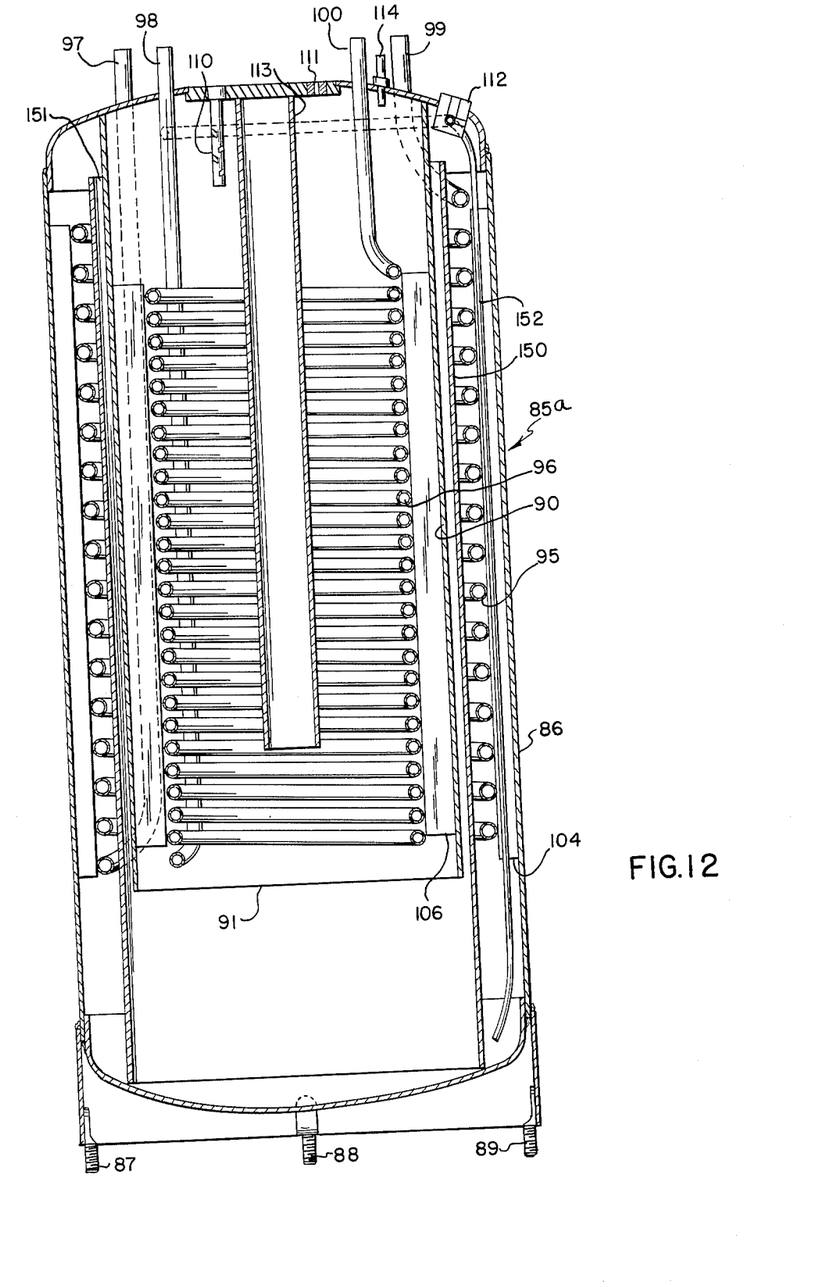
FIG. 12 is a vertical sectional view of a carbonator similar to that shown in FIG. 10, but showing further modifications therein.

Referring to FIG. 12 there is shown a triple-tank cooler carbonator tank 85a which is similar to the carbonator 85 of FIG. 10 except that it contains a third or intermediate wall or tank 150 and a dip pipe 152. Parts which, in the system of FIG. 12, are the same in structure and function as described above in connection with FIG. 10, are designated by the same letters and numerals of reference and will not be further described. In FIG. 12, the intermediate tank 150 is open at the top providing the opening 151 whereby the carbonated water from the circulating line enters the top of the inner tank 90 through the inlet 111, thence through the bottom of the inner tank 90, thence upwardly between the tanks 90 and 150, thence downwardly between the tanks 150 and 86 and out the outlet dip pipe 152 thereby providing very thorough circulation and cooling of the carbonated water within the tanks and over the refrigerant coils therein.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

I claim:

1. In a beverage system for carbonating, refrigerating, storing and dispensing water, a carbonator, a dispensing faucet remote from the carbonator, conduit means connecting the faucet and the carbonator and providing separate paths to and from the faucet in a closed pressurized circuit, pump means forcing water over the circuit, refrigerating means in heat exchange relation to the circulating water, sources of water and of carbon dioxide under pressure, a pressure regulator for and connected to the carbon dioxide source, and supply means connected to said sources and regulator to receive water and regulated carbon dioxide therefrom automatically supplying water and carbon dioxide to the pressurized circuit in continuous replenishment of that dispensed through the faucet, said supply means being adapted to maintain the water and the carbon dioxide in the circuit within predetermined volume and pressure limits, and a storage tank operatively communicating with the conduit means connecting the faucet and the carbonator for receiving, circulating and storing carbonated water therein from the pressurized circuit.

2. The structure of claim 1 wherein said storage tank contains cooling coils for cooling certain associated liquids used in said beverage system, such as flavored syrups, supply water, or the like.

3. The structure of claim 2 and further including a source of flavoring syrup, and said cooling coils in said storage tank being connected to said source of flavoring syrup and to the carbonator to cool the syrup before it is dispensed into the beverage system.

4. The structure of claim 1 and further including a plurality of storage tanks, each located adjacent one of said faucets.

5. The method of cooling, storing and dispensing carbonated water which comprises: maintaining a body of carbonated water in heat exchange relation with a refrigerating medium; withdrawing such refrigerated water from the body continuously; circulating the withdrawn water over a closed path and in a continuous stream of relatively small cross sectional area past a remote dispensing point from which it may be dispensed as desired; returning the remaining circulated water to said body; maintaining a confined atmosphere of pressurized carbon dioxide in the path of the circulating water; spraying the circulating water through the carbon dioxide atmosphere and picking up carbon dioxide from such carbon dioxide atmosphere for augmentation of the carbon dioxide content of such circulating water; automatically adding supply water to said body to replace that released for consumption to maintain said body within predetermined volumetric limits; automatically adding carbon dioxide to said atmosphere in replacement of that picked up by the circulating water to maintain the carbon dioxide atmosphere within predetermined pressure limits; and maintaining a reserve body of said circulating refrigerated carbonated water upstream of said dispensing point.

6. A method as claimed in claim 5, wherein said reserve body is located adjacent said dispensing point.

7. A method as claimed in claim 5, comprising the further step of bringing flavored syrups, supply water, or the like, into heat exchange relation with the reserve body of refrigerated carbonated water to thereby precool the former.

8. A method as claimed in claim 7, wherein said reserve body is located adjacent said dispensing point.

9. In a beverage system, a carbonator for carbonating water, a dispensing faucet remote from said carbonator, first conduit means for communicating carbonated water from said carbonator to said faucet, separate second conduit means for communicating carbonated water from said faucet back to said carbonator, whereby a closed circuit is defined between said carbonator and said faucet from which carbonated water may be dispensed by said faucet, means for causing carbonated water to continuously circulate through the circuit, means for refrigerating the circulating carbonated water, and means for supplying water and carbon dioxide to said carbonator to continuously replenish that dispensed through said faucet, said carbonator comprising an inner carbonating tank, an intermediate tank communicating at one end with said inner tank, and an outer storage tank communicating with the other end of said intermediate tank for providing storage capacity for the circulating carbonated water, said first conduit means communicating with one of said inner and outer tanks and said second conduit means communicating with the other of said inner and outer tanks, whereby carbonated water circulating through the system will circulate through all three tanks of said carbonator.

10. A system as claimed in claim 9, wherein said inner tank is open at the bottom and communicates with the bottom of said intermediate tank, and said intermediate tank is open at the top and communicates with the top of said outer tank.

11. A system as claimed in claim 10, wherein said first conduit means communicates with the bottom of said outer tank and said second conduit means communicates with the top of said inner tank.

12. A system as claimed in claim 9, wherein said refrigerating means includes refrigerating coils disposed inside said inner carbonating tank and outside said intermediate tank.

13. A system as claimed in claim 10, wherein said first conduit means communicates with the bottom of said outer tank and said second conduit means communicates with the top of said inner tank, and wherein said refrigerating means includes refrigerating coils disposed inside said inner carbonating tank and outside said intermediate tank.

14. A system as claimed in claim 9, further comprising a reserve storage tank connected in said first conduit means serially with and upstream of said faucet and adapted to function in a condition in which it is substantially filled with the circulating refrigerated carbonated water, and at least one set of coils in said reserve tank in heat exchange relation with the carbonated water therein for precooling flavored syrups, supply water, or the like.

15. In a beverage system having a dispensing station and a remotely located supply station, including a carbonator for carbonating water at the supply station, means for refrigerating the carbonated water at the supply station, a dispensing faucet at the dispensing station, first conduit means for communicating refrigerated carbonated water from the carbonator and refrigerating means to the faucet, separate second conduit means for communicating carbonated water from the faucet back to the refrigerating and first conduit means at the first station, whereby a closed circuit is defined between the two stations from which carbonated water may be dispensed by the faucet, means for causing the refrigerated carbonated water to continuously circulate through the circuit, and means for supplying water and carbon dioxide to the carbonator to continuously replenish that dispensed through the faucet: a storage tank connected in the first conduit means serially with and upstream of the faucet and adapted to function in a condition in which it is substantially filled with the circulating refrigerated carbonated water, and at least one set of coils in said storage tank in heat exchange relation with the carbonated water therein for precooling flavored syrups, supply water or the like.

16. A system as claimed in claim 15, wherein said storage tank is located adjacent the faucet at the dispensing station.

References Cited by the Examiner

UNITED STATES PATENTS

| | | | |
|---|---|---|---|
| 2,127,732 | 8/1938 | Heitman | 62—394 X |
| 2,403,272 | 7/1946 | Freer | 62—394 |
| 2,519,533 | 8/1950 | Arnett | 261—140 |
| 2,541,757 | 2/1951 | Grier | 261—140 |
| 3,011,681 | 12/1961 | Kromer | 222—1 |
| 3,058,620 | 10/1962 | Kromer | 222—1 |

ROBERT B. REEVES, *Primary Examiner.*

LOUIS J. DEMBO, *Examiner.*

F. R. HANDREN, H. S. LANE, *Assistant Examiners.*